US011485047B2

(12) United States Patent
Ougier et al.

(10) Patent No.: US 11,485,047 B2
(45) Date of Patent: Nov. 1, 2022

(54) EXTRUSION FACILITY COMPRISING AN IMPROVED EXTRUSION HEAD

(71) Applicant: Compagnie Generale Des Etablissements Michelin, Clermont-Ferrand (FR)

(72) Inventors: Christophe Ougier, Clermont-Ferrand (FR); Arnaud Letocart, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 393 days.

(21) Appl. No.: 16/468,816

(22) PCT Filed: Dec. 22, 2017

(86) PCT No.: PCT/FR2017/053833
§ 371 (c)(1),
(2) Date: Jun. 12, 2019

(87) PCT Pub. No.: WO2018/115796
PCT Pub. Date: Jun. 28, 2018

(65) Prior Publication Data
US 2019/0308361 A1 Oct. 10, 2019

(30) Foreign Application Priority Data

Dec. 22, 2016 (FR) ...................................... 1663254

(51) Int. Cl.
*B29B 7/74* (2006.01)
*B29C 48/025* (2019.01)
(Continued)

(52) U.S. Cl.
CPC .......... *B29B 7/7466* (2013.01); *B29B 7/7495* (2013.01); *B29C 48/025* (2019.02);
(Continued)

(58) Field of Classification Search
CPC ... B29C 48/025; B29C 48/2562; B29C 48/16; B29C 48/07; B29C 48/49; B29C 48/304
See application file for complete search history.

(56) References Cited

U.S. PATENT DOCUMENTS

| 4,137,027 A | | 1/1979 | Wolfgand | |
| 4,329,133 A | * | 5/1982 | Gallizia | ................ B29C 48/156 425/114 |
| 4,657,718 A | * | 4/1987 | Sicka | ................. B29D 30/0681 264/146 |
| 4,756,682 A | | 7/1988 | Blaise | |

(Continued)

FOREIGN PATENT DOCUMENTS

| CN | 102811849 A | 12/2012 |
| DE | 3010691 A1 | 9/1981 |

(Continued)

OTHER PUBLICATIONS

Int'l Search Report for PCT/FR2017/053833, dated Apr. 5, 2018.

*Primary Examiner* — Galen H Hauth
(74) *Attorney, Agent, or Firm* — Dickinson Wright PLLC; Steven C. Hurles

(57) ABSTRACT

The facility for manufacturing a profile strip made from several elastomer mixtures with different compositions by coextrusion includes at least two extruders which feed elastomer mixtures to an extrusion head. The extruders discharge directly into the extrusion head, which is interchangeable and groups together all of the dimensional tooling.

12 Claims, 4 Drawing Sheets

(51) Int. Cl.
*B29C 48/25* (2019.01)
*B29C 48/16* (2019.01)
*B29C 48/07* (2019.01)
*B29C 48/49* (2019.01)
*B29C 48/30* (2019.01)
*B29C 48/21* (2019.01)
*B29C 48/12* (2019.01)

(52) U.S. Cl.
CPC .............. *B29C 48/07* (2019.02); *B29C 48/12* (2019.02); *B29C 48/16* (2019.02); *B29C 48/21* (2019.02); *B29C 48/2562* (2019.02); *B29C 48/25686* (2019.02); *B29C 48/3001* (2019.02); *B29C 48/304* (2019.02); *B29C 48/49* (2019.02)

(56) References Cited

U.S. PATENT DOCUMENTS

| | | | | |
|---|---|---|---|---|
| 6,213,748 | B1 * | 4/2001 | Bertram | ............... B29C 48/21 425/133.5 |
| 7,311,505 | B2 | 12/2007 | Ohki et al. | |
| 2018/0147769 | A1 * | 5/2018 | Reineke | ............... B29C 48/49 |

FOREIGN PATENT DOCUMENTS

| | | |
|---|---|---|
| DE | 4304174 A1 | 8/1994 |
| EP | 0246142 A1 | 11/1987 |
| JP | S52-14679 A | 2/1977 |
| JP | S54-58762 A | 5/1979 |
| JP | 2000-117813 A | 4/2000 |
| JP | 4053687 B2 | 11/2000 |
| JP | 2000318016 A | 11/2000 |
| JP | 2005-254464 A | 9/2005 |
| WO | 2015/028166 A1 | 3/2015 |

* cited by examiner

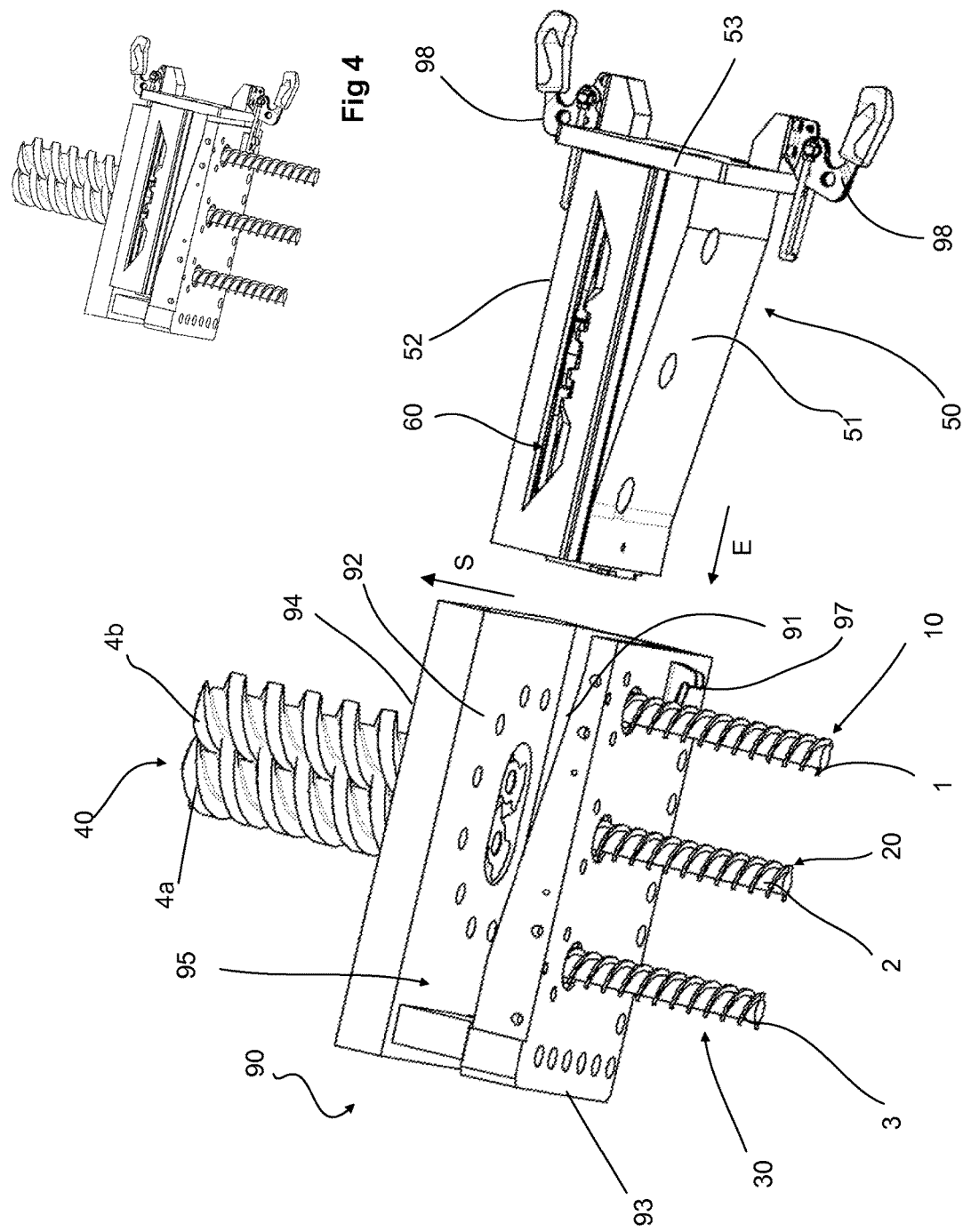

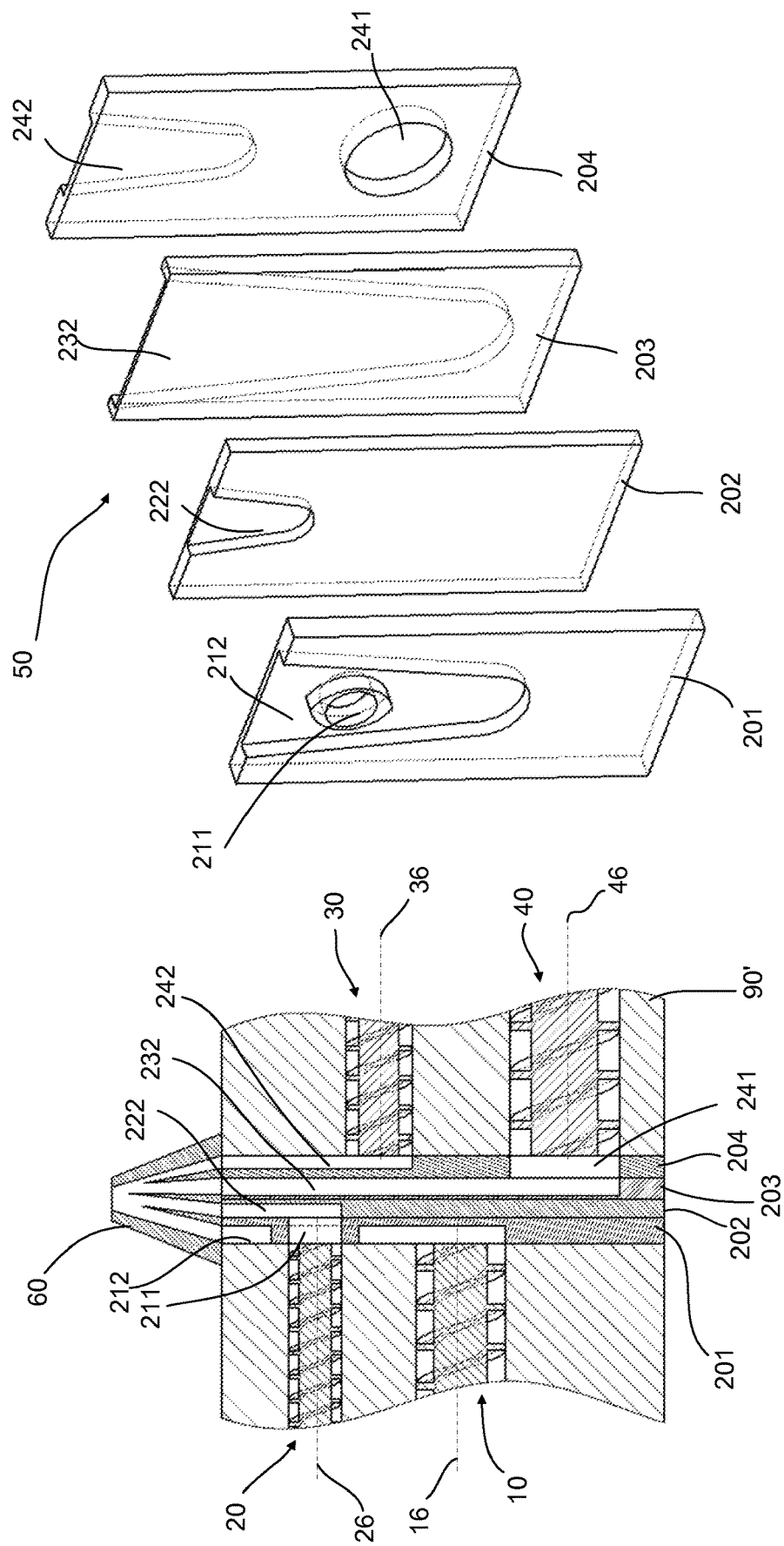

EXTRUSION FACILITY COMPRISING AN IMPROVED EXTRUSION HEAD

CROSS-REFERENCE TO RELATED APPLICATION

The present application claims priority to PCT International Patent Application No. PCT/FR2017/053833, filed Dec. 22, 2017, which claims priority to FR 1663254, filed Dec. 22, 2016.

BACKGROUND OF THE INVENTION

1. Field of the Invention

The present disclosure relates to the field of extrusion of elastomer mixtures for manufacturing tires. More specifically, it relates to the manufacturing of coextruded complex profiled elements made from elastomer mixtures with different compositions.

2. Related Art

In a known manner, the manufacturing of complex profiled elements by extrusion of at least two elastomer mixtures with different compositions, or coextrusion, uses several extruders connected to a common extrusion head. Each extruder is made up of a fixed cylindrical body or sleeve inside which there is a screw coaxial with the longitudinal axis of the sleeve and rotated about said axis. The function of the screw is to homogenize a rubber mixture that is introduced into it, and push it towards an outlet die. For a complex product, the outlet die receives several elastomer mixtures with different compositions and determines the profile of the rubber strip. This profile is defined by a fixed profiled blade engaging with a rotating roller or a fixed wall.

Nowadays, complex products are increasingly used to reduce the number of successive applications of products during assembly, reduce costs and improve the quality of the end product. Preference is given to obtaining these complex products by coextrusion, as this method ensures improved cohesion between the different components. The number of components that form a complex profiled element is tending to increase, which complicates the making of the production tooling and gives it a larger footprint.

WO 2015/028166 is thus known, which describes a coextrusion facility using five extruders arranged in parallel and used to manufacture a tire tread. A complex profiled element is thus obtained by coextrusion of different mixtures arriving, through five different passageways, at a common extrusion head provided at its outlet with a profiling device. The extruders are all arranged on the side opposite the product outlet. When a change of profile of the extruded complex is desired, the downstream part of the fixed extrusion head, containing the profiling die, is replaced. Thus, the upstream tooling containing the passageways through which the mixtures arrive is fastened to the extruders and can only be replaced by means of lengthy dismantling operations. In addition, due to the convergence of the flows of mixtures on a single side, the footprint of the extrusion head is very large and the facility must contain very robust mechanisms for locking the extrusion head in order to counter the extrusion pressure.

One solution to this problem is described in JP 4053687, which proposes arranging the different extruders on either side of the outlet die of the coextruded complex product. The coextrusion assembly according to this document comprises a fixed extrusion head provided with an outlet die in the lower central portion and three fixed extruders mounted two on the right and one on the left of the die. According to this document, the type of profiled element can be changed by replacing the die with another die that communicates with the three extruders and with a removable fourth extruder placed underneath. The forces absorbed by the extrusion head are undoubtedly smaller than in the previous document due to the different arrangement of the extruders. However, the extrusion head in this document comprises very deep preforming channels that connect the extruders to the die and are difficult to clean. As a result, the extrusion assembly in this document produces a lot of waste when the mixtures of the different extruders are changed.

Another extrusion facility is also known from U.S. Pat. No. 7,311,505, comprising a fixed extrusion head provided with an outlet die in the lower central portion and four fixed extruders mounted two on the right and two on the left of the die. The extrusion head also comprises three mobile parts that are moved at the end of the operation to open the head and provide access to the deep channels that connect the extruders to the extrusion die. As it is more judiciously produced than the structure in the previous document, the structure of the extrusion head in this document is quite complex and has to call on different mechanisms and actuators to open and close different parts forming the extrusion head.

SUMMARY OF THE INVENTION

One aim of the disclosure is to overcome the drawbacks of the aforementioned documents and provide an original solution for the design of the extrusion head that makes it possible to improve the operation to clean the facility at the end of operation and reduce the time required for this.

This aim is achieved by the disclosure, which proposes a facility for manufacturing a profile strip made from several elastomer mixtures with different compositions by coextrusion, comprising at least two extruders feeding elastomer mixtures to an extrusion head, characterized in that the extruders discharge directly into said extrusion head, which is interchangeable and groups together all of the dimensional tooling.

Dimensional tooling is given to mean the tooling that gives the profiled element its shape and dimensions from the outlet orifices of the extruders. This dimensional tooling is generally formed by the transfer channels between the outlet of each extruder and the inlet to the extrusion die, together with the extrusion die. Transfer channel is given to mean a duct that connects the outlet orifice of an extruder and the inlet to an extrusion die. The removable extrusion head of the disclosure therefore comprises the entire dimensional part of the tooling that is specific to a coextruded profiled product.

In other words, the extrusion head is directly connected to the extruders without any elastomer mixture transfer channel between the two, the transfer channels between the end of the screw of the extruder and the outlet to the die being contained completely in the removable extrusion head. The extrusion head according to the disclosure thus groups together all of the dimensional tooling (transfer channels and extrusion die) specific to a given profiled element in a single unit. In the event of a change of profiled product, such an interchangeable or removable unit is quickly removed and replaced by another unit suited to the new product.

Thus, at the end of the extrusion operation when a change of coextruded profiled product is desired, the extrusion head is removed and replaced by another extrusion head specific to the new profiled product. The extruders are emptied, having each discharged all of the mixture during the previous operation, and once the new extrusion head is in place, a new coextrusion operation can be started without waiting. This thus avoids the tedious cleaning of the transfer channels or the appearance of mixed waste as in the facilities of the prior art. As a result, productivity is improved and costs are reduced.

Preferably, the end of the screw of each extruder arrives substantially level with the corresponding inlet orifice of the extrusion head. Substantially is given to mean at the mouth of the corresponding inlet orifice of the extrusion head or ideally a very small distance away, a few mm or at least smaller than the diameter of the extruder, and without any substantial reduction in the cross-section thereof. This makes it possible to eliminate any residual mixture remaining between the two and thus eliminate mixed waste mixture.

Advantageously, the extrusion head is a single assembly in the form of a right prism. This makes it possible to remove or insert a single unit from or into the facility.

Preferably, said extruders are mounted on a common support comprising a housing for receiving the extrusion head. This solution is simple and robust.

Advantageously, the extrusion head comprises side walls forming the interface with said support. These side walls then have orifices enabling the mixture to arrive into the extrusion head.

Preferably, the extrusion head is translatably mobile relative to said support. This enables the rapid removal of an extrusion head and the easy replacement thereof with another.

Advantageously, the direction of movement of the extrusion head is perpendicular to the longitudinal axis of at least one of the extruders.

In an advantageous variant of the disclosure, at least one of the side walls is inclined. Thus, when the extrusion head is fully inserted into the support, a good seal is obtained between the extrusion head and the support.

Advantageously, the facility comprises means for quickly fastening the extrusion head to said support. This makes it possible to lock and unlock the extrusion head quickly relative to the support.

In another advantageous variant of the disclosure, said support comprises at least one side wall that is translatably mobile in a direction perpendicular to the direction of movement of the extrusion head. Thus, when the mobile wall is in contact with the facing side wall of the extrusion head, a good seal is obtained between the extrusion head and the support.

Advantageously, the extrusion head comprises a set of several plates arranged side by side, each plate comprising at least one cavity making it possible to channel the mixture coming from an extruder towards an outlet orifice and arranged substantially transverse to the output direction of the flow of mixture from said extruders.

Plate arranged substantially transverse to the direction of the flow is given to mean that the plate is arranged so that it faces the flow of mixture and suddenly changes the orientation thereof by an angle equal to the angle at which it is arranged. Such an angle is approximately 90°, with a tolerance of 20°. Preferably, such an angle is between 70° and 110°. The discharge at approximately 90° of the extrudate exiting the screw of the extruder makes it possible to obtain a certain continuity of the flow area from the threads of the screw to the channels of the extrusion head and the die. A swelling/head loss ratio is thus achieved that is therefore significantly better than in the solutions of the prior art.

Preferably, at least one plate comprises a through-orifice that makes it possible to connect the outlet orifice of an extruder to the cavity of an adjacent plate.

This enables an elastomer mixture coming from an extruder to pass through an orifice in the first plate into the transfer channel of an adjacent plate. Thus, with a set of appropriate plates and orifices, the order in which the mixtures arrive at the extrusion head can be changed and the transfer thereof to the outlet via the extrusion die is organized, while retaining the initial layout of the extruders.

The aim of the disclosure is also achieved with a method for manufacturing a profile strip made from several elastomer mixtures with different compositions by coextrusion using at least two extruders feeding elastomer mixtures to an extrusion head, in which:

an extrusion head suited to the profiled element to be coextruded is selected and inserted into a support provided to this end in the facility so that it arrives level with the outlet orifices of the extruders, the transfer channels between the end of the screw of each extruder and the extrusion die being located in the interchangeable extrusion head;
it is locked in place using quick fastening means;
the strip of product is coextruded;
the extrusion head is removed.

Preferably, the method of the disclosure comprises an additional step during which the extrusion head is preheated before being inserted into the facility. This makes it possible for the extrusion head to be the same temperature as the extruders for improved productivity of the facility.

BRIEF DESCRIPTION OF THE DRAWINGS

The disclosure will be more clearly understood from the description below, which is given with reference to the following figures:

FIG. 3 is a perspective view of the facility of the disclosure according to another embodiment in the idle position;

FIG. 4 is a smaller-scale view of the facility in FIG. 3, shown in the working position;

FIG. 7 is a cross-sectional view of the extrusion head of the disclosure according to a further embodiment;

FIG. 8 is an exploded view of the components of the extrusion head in FIG. 7.

DETAILED DESCRIPTION OF THE ENABLING EMBODIMENT

In the different figures, identical or similar elements have the same reference sign. They will not therefore necessarily be described again.

Figure 1:
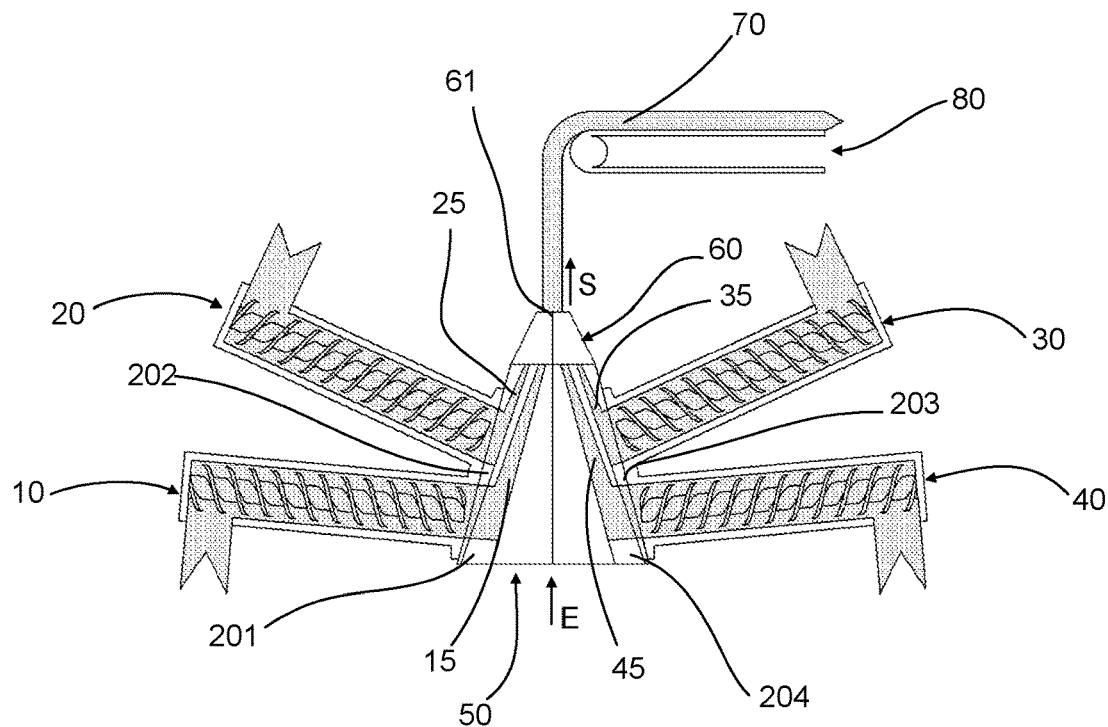
FIG. 1 is a cross-sectional schematic view of the facility of the disclosure according to one embodiment in the working position.
Figure 2:
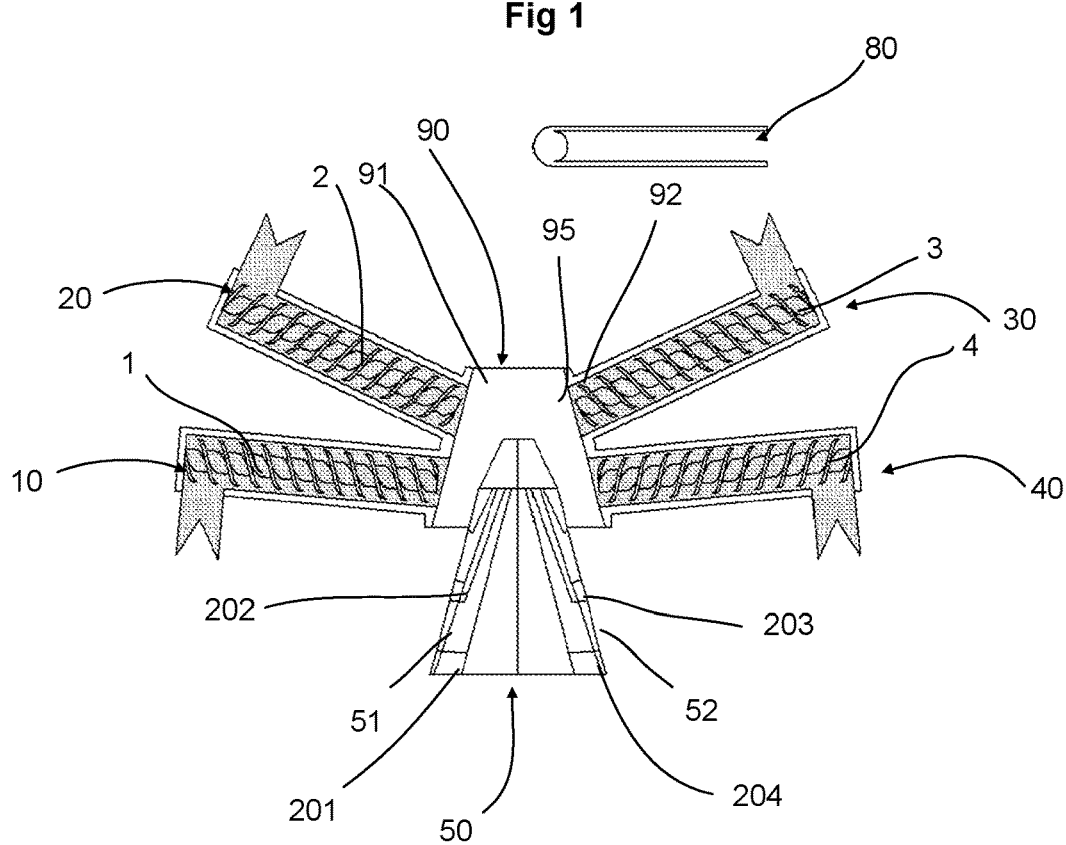
FIG. 2 is a cross-sectional schematic view of the facility of the disclosure according to one embodiment in the idle position.

In FIGS. 1 and 2, the extrusion facility 1 comprises four extruders 10, 20, 30, 40, an extrusion head 50 and an extrusion die 60. The extrusion head 50 connects the outlets of the extruders 10, 20, 30, 40 to an extrusion die 60 that enables the forming of the profiled element. The complex profile strip 70 is produced by coextrusion of the four simple profiled elements coming from the different extruders, which are brought together at the outlet end portion 61. The complex profile strip 70 is then conveyed by a transport device, such as a conveyor 80.

As is generally known, the different mixtures extruded by the extruders 10, 20, 30 and 40 pass through the extrusion head 50 without mixing and are laminated and formed by the die 60.

Such different elastomer mixtures are, by way of example, mixtures made from elastomers or rubber used to create a tread assembly such as: a first 100% natural rubber material to produce an underlayer, then a second 100% synthetic rubber material to produce the tread, followed by third and fourth materials to produce the sidewalls made up of a natural rubber/synthetic rubber mixture (20% to 80% natural rubber). Different elastomer mixtures sent into an extrusion head according to the disclosure is therefore given to mean that at least two different mixtures arrive at the head from at least two different extruders. Identical mixtures, such as third and fourth mixtures having the same composition, can also be received in the extrusion head from other extruders.

According to the disclosure, the extruders 10, 20, 30, 40 discharge directly into an interchangeable extrusion head 50. Thus, the extrusion head is connected directly to the extruders without there being an elastomer mixture transfer channel between the two.

As can be seen more clearly in FIG. 3, the extruders 10, 20, 30, 40 are arranged on either side of a common support 90 and are fastened thereto. By way of example, each extruder sleeve is fastened to the side walls 93, 94 of the support 90 by means of a flange provided with screw fastenings and seals. The support 90 is a generally prismatic unit inside which there is a recess the shape and dimensions of which correspond to those of the extrusion head 50 and which forms a housing 95 for the extrusion head. More particularly, according to the disclosure, the ends of the screws 1, 2, 3 of the extruders 10, 20, 30 arrive substantially level with the plane that forms the interface between the inner surface 91 of the support 90 and the outer surface 51 of the extrusion head 50. The same applies to the ends of the screws 4a, 4b of the extruder 40, which arrive substantially level with the plane that forms the interface between the inner surface 92 of the support 90 and the outer surface 52 of the extrusion head 50. More specifically, the ends of the screws arrive at the inlet of the through-holes that are made in the side walls 93, 94 of the support 90 to enable the mixtures coming from the outlet orifices of the extruders to pass through to the inlet orifices inside the extrusion head 50. The direction of movement of the extrusion head 50 relative to the support 90, shown by the arrow E in FIG. 1, is parallel to the output direction of the profiled product via the extrusion die 60, shown by the arrow S in the same figure. The extrusion die 60 is rigidly connected to the extrusion head 50 and is movably mounted therewith relative to the support 90 of the facility.

Thus, at the end of the extrusion operation when a change of coextruded profiled product is desired, the extrusion head 50 is moved away from the support 90 and replaced by another extrusion head specific to the new profiled product. The extruders 10, 20, 30, 40 are emptied, having each discharged all of the mixture during the previous operation, and once the new extrusion head is in place, a new coextrusion operation can be started without waiting.

A facility comprising an extrusion head of the disclosure thus makes it possible to facilitate a change of profiled product to be manufactured; as the machine is clean at the end of the operation, there is no longer any need to empty the transfer channels that make up the facilities of the prior art.

According to one advantageous aspect of the disclosure, the extrusion head 50 is a single assembly or unit that is inserted into the support 90 and it is removed therefrom by a translational movement in a predetermined direction of movement. The extrusion die 60 completes the assembly forming the extrusion head 50. In the embodiment shown in FIG. 3, the direction of translational movement of the extrusion head 50 is perpendicular to the longitudinal axes of the extruders 10 and 40. A robotic arm can thus be used, for greater ease, which grips the extrusion head 50 and moves it relative to the support 90 with a view to replacing it with a new head. The direction of movement of the extrusion head 50 relative to the support 90, shown by the arrow E in FIG. 1, is perpendicular to the output direction of the profiled product, shown by the arrow S in the same figure.

According to one important aspect of the disclosure, at least one of the side walls 51 and 52 of the extrusion head 50 and at least one of the inner walls 91, 92 of the support 90 are inclined, and form the same angle relative to a plane parallel to the plan containing the axis of movement of the extrusion head 50. Preferably, such an angle of inclination is small in order to limit the force to lock the extrusion head in place; it is preferably less than 30°. For angles less than approximately 15° (depending on the coefficient of contact friction, which depends on the material of the parts in contact), mechanical wedging can contribute to the retention of the tooling. However, angles less than 3° are avoided, as the positioning of the extrusion head is more difficult to control (with regard to matching up the screw cylinder and the through-orifice in the extrusion head). In a preferred embodiment, an angle of 6° is selected.

In the embodiment shown in FIGS. 3 to 6, so as to simplify the construction, only the wall 51 of the extrusion head and the corresponding wall 91 of the support are inclined, the other walls being parallel to the direction of movement of the extrusion head. This inclined wall construction makes it possible to ensure the seal between the inner walls of the support and the outer walls of the extrusion head during the movement to insert the extrusion head into its housing inside the support. When the extrusion head has arrived at its operating position inside the support 90, it is locked in position by means of quick fastening means 99, for example using knuckle joint couplings 98 arranged between each side edge of the front wall 53 of the extrusion head 50 engaging with spurs 97 fastened to the side walls 93 and 94 of the support 90.

In one variant, not shown in the figures, at least one of the side walls 93, 94 of the support 90 is translatably mobile, being rigidly connected to the mobile part of an actuator, for example the rod of a cylinder, in a direction perpendicular to the direction of movement of the extrusion head 50 when it is inserted into the support. Thus, once the extrusion head is installed inside the support, one and/or the other of the side walls is brought closer to the support to ensure the seal between the support and the extrusion head.

The extruders that feed the extrusion head are single-screw or twin-screw extruders of the known type that therefore comprise one or two worms rotated by a motor inside a sleeve. Preferably, at least one of the twin-screw extruders is a positive displacement extruder of the twin-screw pump type comprising two counter-rotating screws with interpenetrating threads and conjugated profiles, rotated by motors in opposite directions inside a sleeve. In a preferred embodiment of the disclosure, all of the extruders 10, 20, 30, 40 are twin-screw positive displacement extruders that provide a constant output to enable good accuracy of the profiled element obtained by coextrusion.

Figure 5:
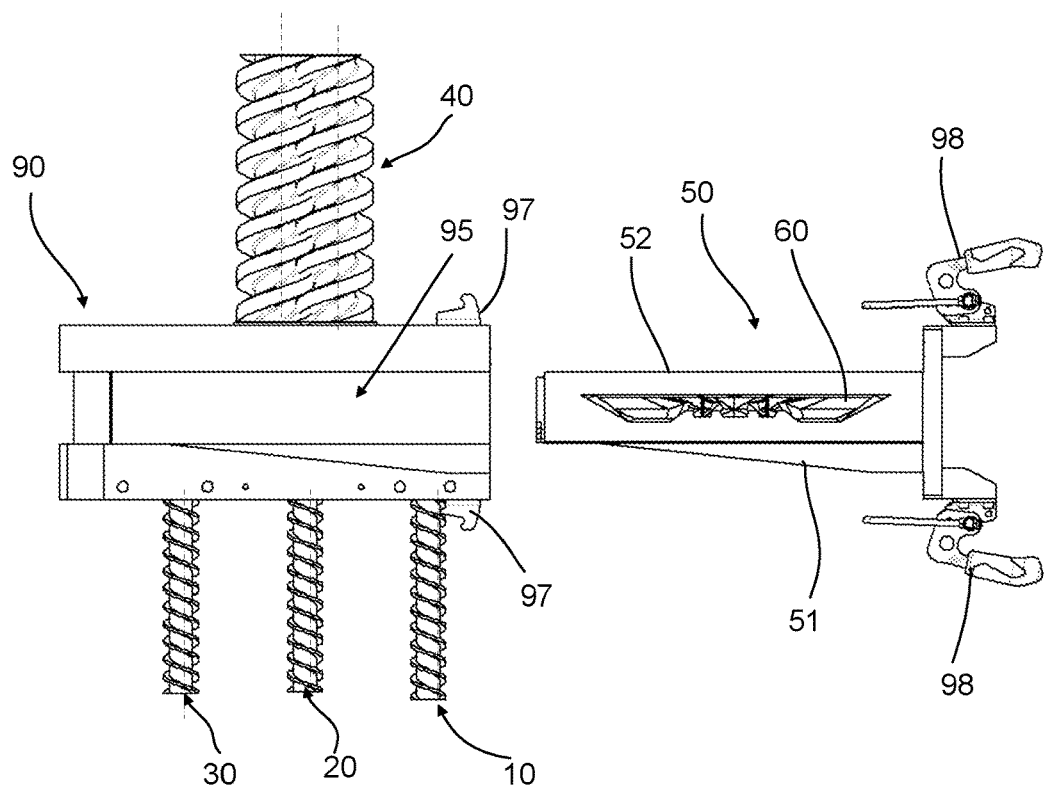
FIG. 5 is a top view of the facility in FIG. 3 in the idle position.
Figure 6:
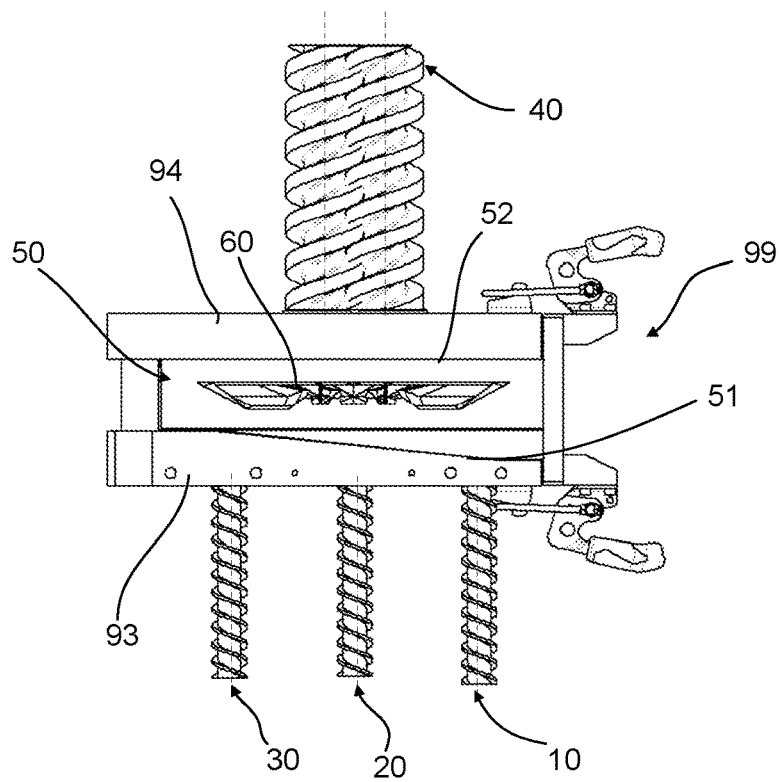
FIG. 6 is a top view of the facility in FIG. 3 in the working position.

FIGS. 5 and 6 show top views of the facility in FIG. 3. The extrusion head 50 is being inserted into the housing 95 in the support 90 in FIG. 5 and it is in place inside the support 90 in FIG. 6.

Advantageously, in the embodiments shown in FIGS. 3 to 8, the extrusion head 50 comprises an assembly made up of a stack of parallel flat plates perpendicular to the longitudinal axis of the extruders 10, 20, 30, 40 and therefore to the direction of feeding of the flow of elastomer mixture. The mixtures thus arrive through separate channels at the extrusion die 60, where they form the coextruded profiled element.

FIGS. 7 and 8 show, in a simplified manner, another embodiment of the extrusion head 50 comprising such a stack of plates. For greater clarity, the side walls that form the support of the extrusion head have been omitted from FIGS. 7 and 8. The extrusion head 50 comprises a stack of four parallel flat plates that extend in planes perpendicular to the longitudinal axes 16, 26, 36, 46 of the extruders 10, 20, 30, 40 and are provided with channels for transferring the mixture along the plates towards an outlet die. Such an arrangement makes it possible to reduce the length of the transfer channels between the outlet end portions of the extruders and the extrusion die and thus reduce the head loss undergone by the extruded mixture.

In the example shown in FIGS. 7 and 8, the first plate 201 comprises a cavity 212 made in the thickness of the wall of the plate, the cavity 212 being flared upwards towards the extrusion die from a circular base with a diameter equal to the diameter of the outlet orifice of the sleeve of the extruder 10. The cavity 212 thus forms a first channel for transferring mixture coming from the extruder 10. The first plate 201 also comprises a through-orifice 211 that communicates with the second extruder 20 to transfer the mixture discharged by it to the transfer channel made in the second plate 202.

The second plate 202 comprises a cavity 222 made in the thickness of the wall of the plate, the cavity 212 being flared upwards towards the extrusion die from a circular base with a diameter equal to the diameter of the outlet orifice of the sleeve of the extruder 20 and the diameter of the orifice 211. The cavity 222 thus forms a second channel for transferring mixture coming from the extruder 20.

The fourth plate 204 comprises a cavity 242 made in the thickness of the wall of the plate, the cavity 242 being flared upwards towards the extrusion die from a circular base with a diameter equal to the diameter of the outlet orifice of the sleeve of the extruder 30. The cavity 242 thus forms a fourth channel for transferring mixture coming from the extruder 30. The fourth plate 204 also comprises a through-orifice 241 that communicates with the outlet of the fourth extruder 40 to transfer the mixture discharged by it to the transfer channel made in a third plate 203.

The third plate 203 comprises a cavity 232 made in the thickness of the wall of the plate, the cavity 232 being flared upwards towards the extrusion die from a circular base with a diameter equal to the diameter of the outlet orifice of the sleeve of the extruder 40 and the diameter of the through-orifice 241. The cavity 232 thus forms a third channel for transferring mixture coming from the extruder 40.

Of course, as in the example in FIGS. 3 to 6, the plates 201, 202, 203, 204 are held together by side walls 51, 52 and a crossbeam 53 so as to form an extrusion head in the form of a single unit or assembly. Such an extrusion head is applied in a sealed manner to the outlet of the extruders 10, 20, 30, 40. In an advantageous variant of the disclosure, the support 90 is in two parts, at least one 90' being axially mobile in order to clamp the extrusion head 50 and apply the outlet orifices of the extruders to the corresponding facing surfaces of the extrusion head 50 in a sealed manner.

Such an extrusion head produced in the form of interchangeable plates makes it possible, through a judicious arrangement of through-orifices and transfer channels between the different plates, to retain the initial layout of the extruders and only change the plates of the extrusion head.

In the coextrusion machines of the prior art, the stacking order of the extruded strips must follow the order in which the extruders are arranged in the facility. This is because each extruder outlet path leads into transfer passageways supported by elements that form an integral part of the machine. Changing them involves highly tedious dismantling operations. As a result, preference is given to retaining the initial configuration of the machine and adjusting the extruder operating conditions to the new profiled element. Such an adjustment of the operating conditions of the extruder is very time consuming.

With the solution of the disclosure, all of the dimensional parts of the machine are grouped together in a removable unit. In addition, such a unit is produced using parallel flat plates perpendicular to the output direction of the flow of mixture and provided with openings and transfer channels making it possible to reverse the order in which the mixtures arrive at the extrusion die. This solution enables the facility to be very flexible, adjusting to a wide variety of coextruded profiled elements, even the most complex, while reducing the waiting and preparation time of the facility or the components thereof.

During operation, an appropriate extrusion head suited to the profiled element to be produced by coextrusion is first selected. Such an extrusion head 50 is preferably produced in advance by stacking parallel plates 201, 202, 203, 204, also parallel with the inner surfaces of the side walls 51, 52 of the extrusion head, and fastening them together by means of a screw fastening, for example. The extrusion head is placed in an oven to heat it and bring it up to the operating temperature of the facility.

The extrusion head is then gripped by a robotic arm (not shown in the drawings) for example and inserted into the housing 95 in the support 90 of the facility, as shown in FIG. 4. The extrusion head is inserted until it is axially wedged due to the inclination of its side walls. At this point, the inlet orifices of the extrusion head and the outlet orifices of the extruders communicate in a sealed manner and the extrusion operation can start.

Other variants and embodiments of the disclosure can be envisaged without leaving the scope of the claims.

Thus, more than four extruders can be arranged on either side of the extrusion head, or even on the other surfaces of the extrusion head that are not given over to either the discharge of the mixtures towards the extrusion die or the gripping of the head with a view to moving it, at least two of them working with different mixtures and certain others with the same elastomer mixture. The disclosure relates to the field of extrusion of elastomer mixtures for manufacturing tires. More specifically, it relates to the manufacturing of coextruded complex profiled elements made from elastomer mixtures with different compositions.

The invention claimed is:

1. A facility for manufacturing a profile strip made from several elastomer mixtures with different compositions by coextrusion, comprising at least two extruders feeding elastomer mixtures to an extrusion head that comprises an extrusion die for outputting the profile strip in an output direction and that further comprises transfer channels to connect the extruders to the extrusion die, wherein the extruders are arranged on side walls of of the extrusion head that are opposite of one another and are perpendicular to axes of the extruders and discharge directly into said extrusion head, wherein said extrusion head forms a single unit which is interchangeable by being displaced along a direction of movement which is parallel to the output direction of the profile strip via the extrusion die and that groups together all dimensional tooling formed by the transfer channels and the extrusion die.

2. The facility according to claim 1, wherein an end of a screw of each extruder arrives substantially level with a corresponding inlet orifice of the extrusion head.

3. The facility according to claim 1, wherein the extrusion head is a single assembly in the form of a right prism.

4. The facility according to claim 1, wherein said extruders are mounted on a common support comprising a housing for receiving the extrusion head.

5. The facility according to claim 4, wherein the side walls of the extrusion head form an interface with said support.

6. The facility according to claim 4, wherein the extrusion head is translatably mobile relative to said support.

7. The facility according to claim 6, wherein the direction of movement of the extrusion head is perpendicular to the longitudinal axis of at least one of the extruders.

8. The facility according to claim 5, wherein at least one of the side walls is inclined.

9. The facility according to claim 4, further comprising a means for quickly fastening the extrusion head to said support.

10. The facility according to claim 4, wherein said support comprises at least one side wall that is translatably mobile in a direction perpendicular to the direction of movement of the extrusion head.

11. The facility according to claim 1, wherein the extrusion head comprises a set of several plates arranged side by side, and wherein each plate comprises at least one cavity making it possible to channel the mixture coming from an extruder towards an outlet orifice and arranged substantially transverse to the output direction of the flow of mixture from said extruders.

12. The facility according to claim 11, wherein at least one plate comprises a through-orifice making it possible to connect the outlet orifice of an extruder to the cavity of an adjacent plate.

* * * * *